Figure 1:
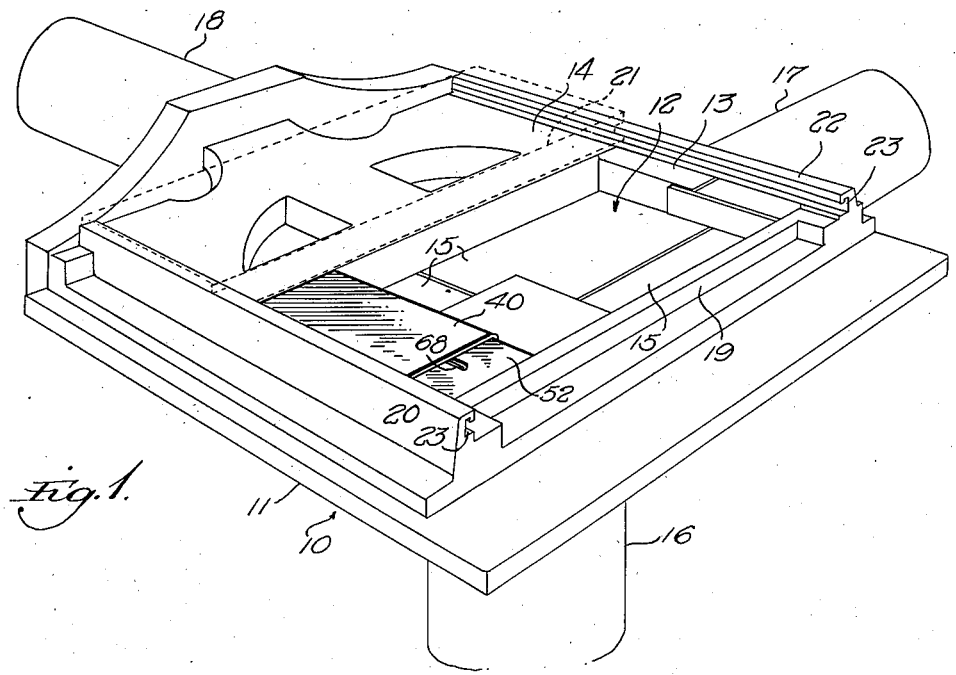

Jan. 9, 1940.  B. J. PIERSON  2,186,495
ATTACHMENT FOR PRESSES
Filed April 17, 1939  2 Sheets-Sheet 1

Inventor
B.J.PIERSON

Jan. 9, 1940. B. J. PIERSON 2,186,495
ATTACHMENT FOR PRESSES
Filed April 17, 1939 2 Sheets—Sheet 2

Inventor
B. J. PIERSON
By
Attorney

Patented Jan. 9, 1940

2,186,495

UNITED STATES PATENT OFFICE 2,186,495

ATTACHMENT FOR PRESSES

Benjamin J. Pierson, Johnstown, N. Y., assignor, by mesne assignments, to Formrite Bacon Press Corporation, Colonie, N. Y., a corporation of New York Application April 17, 1939, Serial No. 268,423

19 Claims. (Cl. 100—57)

This invention relates to attachments for presses, and more particularly to an attachment adapted to be used in connection with bacon presses of the type disclosed in my copending application Serial No. 233,873, filed October 7, 1938.

It is the common practice to slice bacon from bacon bellies and wrap it in transparent paper or the like and in order for the bacon to be sold as "No. 1" quality, it is necessary that the bacon strips be of uniform length and width. In producing bacon bellies, the finished product is somewhat irregular in shape, particularly at its ends, and in slicing the meat transversely of the belly the first few slices are so small as to constitute scrap meat. Such meat usually is used in the manufacture of prepared meat products. The next few slices are sufficiently long for use as bacon but are materially shorter than the width of the belly and accordingly are classed as "No. 2" quality.

A ready market for bacon of "No. 2" quality is not always available and the product must be sold at a material reduction in price. The slices which constitute scrap and "No. 2" quality sometimes amount to as much as 7 per cent by weight of the belly as a whole and accordingly packing houses suffer substantial losses over a period of time due to the necessity for selling the "No. 2" quality bacon at a reduced price and embodying the scrap bacon in relatively low priced prepared meat products.

In my copending application referred to I have disclosed a highly efficient press which is particularly adapted for use in re-shaping bacon bellies. Such press is collapsible in three directions and accordingly squares the ends, edges and faces of the bacon belly. Accordingly the substantial loss involved in the cutting away of short pieces or strips of bacon is substantially eliminated due to the squaring of the ends of the belly, and the strips of the bacon cut from the belly are uniform both as to length and width.

The apparatus of my copending application is particularly intended for use in re-shaping bellies of average size or larger but the minimum size to which the bacon belly can be compressed is limited because of practical considerations. The apparatus accordingly is not adapted for use in pressing so-called "skip" bellies which are relatively thin and short in length.

An important object of the present invention is to provide an attachment for a press of the character shown in my copending application whereby such press is adapted to be used for effectively re-shaping "skip" bellies.

A further object is to provide a filler adapted to be arranged in the press chamber of a press of the character referred to to reduce the space therein and thus permit the pressing of "skip" bellies.

A further object is to provide such an attachment which is adapted for use with a three-dimensional press and wherein the attachment is reducible in size in two directions but not in a third direction, thus making one wall of the attachment stationary to facilitate the re-shaping of relatively short bellies.

A further object is to provide an attachment of this character which is operative upon being merely placed in the press chamber of the press without being connected thereto in any way, thus facilitating the placing of the attachment in position in the press chamber and the removal of the attachment, whenever desired.

Other objects and advantages of the invention will become apparent during the course of the following description.

Figure 2:
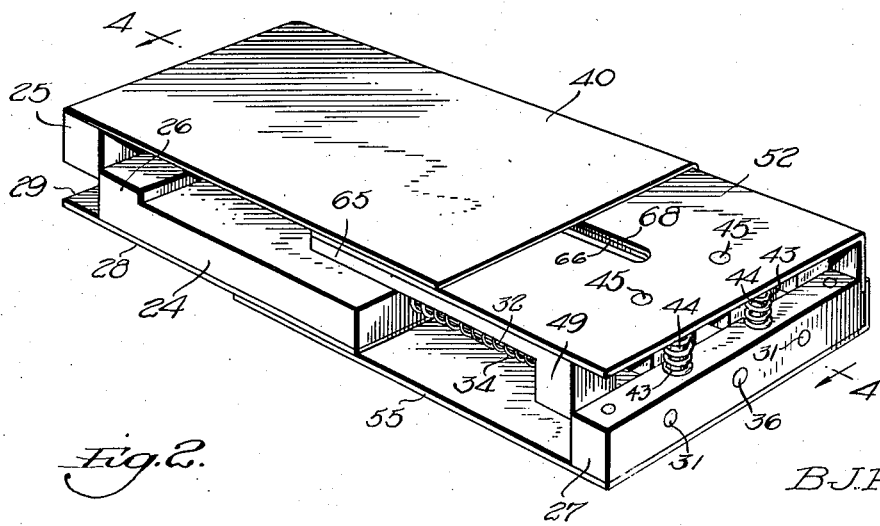
Figure 3:
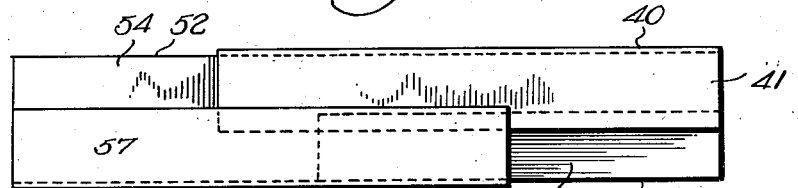
Figure 4:
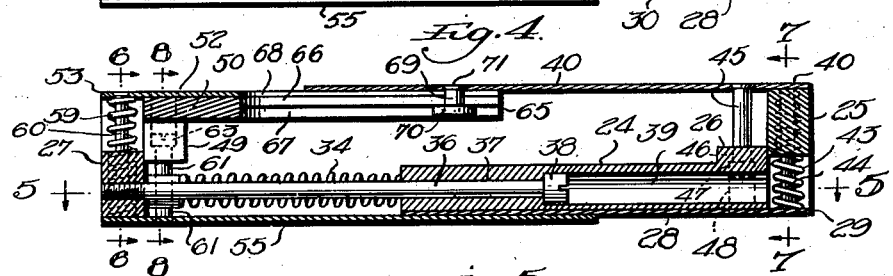
Figure 5:
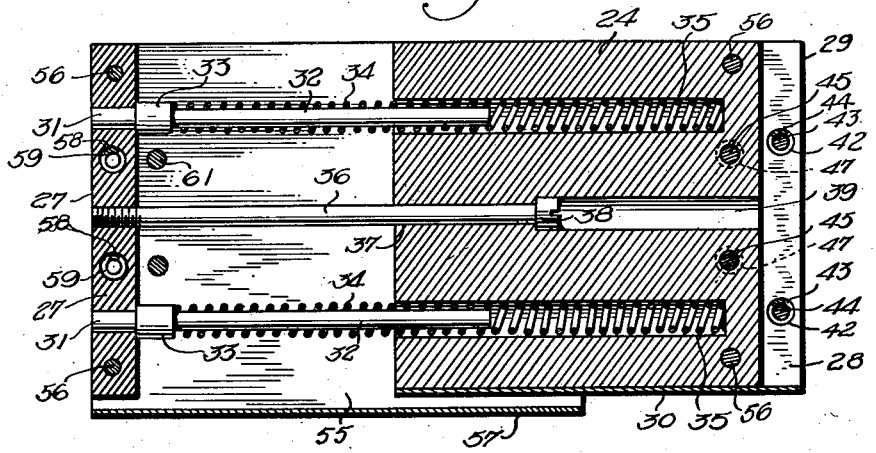
Figures 6, 7:
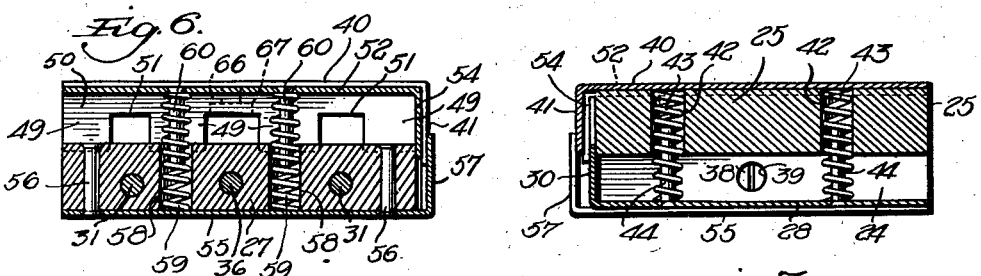
Figure 8:
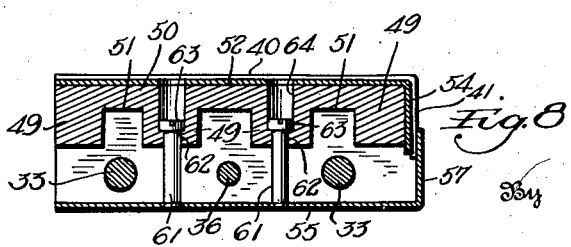

In the drawings I have shown one embodiment of the invention. In this showing:

Figure 1 is a perspective view of a portion of a press similar to the press shown in my copending application referred to, the cover being omitted and indicated in dotted lines, Figure 2 is a perspective view of the attachment, Figure 3 is an edge elevation of the attachment showing the side thereof which forms one wall of the press chamber to engage one end of the bacon belly, Figure 4 is a section on line 4—4 of Figure 2, looking in the same direction as Figure 3, Figure 5 is a horizontal sectional view on line 5—5 of Figure 4, Figure 6 is a transverse sectional view on line 6—6 of Figure 4, Figure 7 is a similar view on line 7—7 of Figure 4, and, Figure 8 is a similar view on line 8—8 of Figure 4.

Referring to Figure 1, the numeral 10 designates a press as a whole having a bed plate 11, a vertically movable platen 12, a horizontal transversely movable header 13 and a horizontal transversely movable header 14. The platen 12 may be made up of a plurality of overlapping plates 15 which are adapted to slide with respect to each other to reduce the platen in both horizontal directions. These platen plates may be formed in the same manner and supported by the same means as in my copending application referred to and form no part of the present invention. The platen 12 is vertically movable by means of a ram 16 having a piston therein (not shown) connected to effect upward movement of the platen 12. The headers 13 and 14 are similarly operable respectively by rams 17 and 18. Inasmuch as the horizontal movement of the header 14 reduces the length of the header 13, the latter must be constructed so as to be telescoping in nature, and the structure of the header 13 may correspond to the structure of the corresponding element of my copending application and forms no part per se of the present invention.

The press further includes a side wall 19 and an end wall 20 which, together with the platen 12 and headers 13 and 14 constitute the press chamber which receives the bacon belly or other article to be pressed. The press chamber is adapted to be closed by a cover 21 which has been omitted and shown in dotted lines for the purpose of illustration. At the end of the press opposite the end wall 20 a similar wall 22 is provided, and the walls 20 and 22 are provided with guides 23 to slidably support the cover 21 for movement to and from operative position.

The filler forming the subject matter of the present invention is shown in detail in Figures 2 to 8 inclusive. The filler is made up of a plurality of parts so connected and relatively movable with respect to each other as to be incompressible in the direction of movement of the press wall 13 and compressible in the direction of movement of the press wall 14 and platen 15. Therefore it will become apparent that the edge of the filler which faces toward the press wall 13 takes the place of the wall 20 as a part of the press chamber and limits the size thereof to render the press effective for pressing so-called "skip" bellies.

The filler, as previously stated, is made up of a plurality of parts and the largest of these parts, which may be considered the body of the device, is indicated by the numeral 24. The body of the device is preferably in the form of a casting sufficiently thick to provide openings to receive elements to be described. The body 24 is arranged toward one end of the device and beyond the body 24 there is arranged a transverse block 25 arranged adjacent and normally in slightly overlapping relationship with an upstanding flange portion 26 formed integral with the body 24. It will become apparent that the contacting faces of the block 25 and flange 26 (Figure 4) slide over each other during the vertical compression of the device.

At the opposite end of the filler, a block 27 is arranged in the horizontal plane of the body 24 and has its upper face terminating approximately in the plane of the top of the flange 26. The body 24 is permanently secured by riveting or the like to a bottom plate 28, one edge 29 of which terminates in the vertical plane of the outer face of the block 25. At the edge of the filler toward the wall 13, the plate 28 is provided with an upturned flange 30 (Figures 3, 5 and 6) which extends slightly over half the thickness of the filler device, in order to be arranged in overlapping relationship with other coacting flanges to be described, as will become apparent.

The block 27 is drilled to receive the ends 31 of stems 32 having heads 33 engageable against the inner face of the block 27. Compression springs 34 surround the stems 32 and extend through openings 35 which extend throughout the greater portion of the length of the block 24 in order to permit the use of relatively long springs 34 which, in turn, permit relatively great contraction in the size of the filler upon movement of the head 14, as will become apparent. It will be apparent that the edge of the block 24 which faces toward the block 27, is spaced a substantial distance therefrom to permit the contraction referred to to take place. Preferably centrally between the springs 34 a rod 36 is threaded at one end in the block 27 and slidably extends through an opening 37 formed in the block 24. The stem 36 carries a head 38 longitudinally movable in an opening 39 formed in the block 24. It will be apparent that when the block 24 moves toward the block 27, the head 38 slides through the opening 39, and it also will be apparent that engagement of the head 38 with the inner end of the opening 39, limits relative movement of the blocks 24 and 27 away from each other. The substantial length of the opening 37 provides an effective bearing for the rod 35 to assist in guiding the block 27 in its movement toward and away from the block 24 while preventing relative lateral movement of these elements.

The block 25 is provided with a top plate 40 riveted or otherwise secured thereto and extending preferably substantially more than half the length of the filler member as a whole, as clearly shown in Figures 3 and 4. This block has a depending flange 41 overlying and slightly spaced from the flange 30, as shown in Figure 7, and these flanges are in slightly overlapping relationship when the parts are in normal position. The plate 40 forms the main top plate of the filler device, as will be apparent in Figure 2. The block 25 is provided with a pair of openings 42 in each of which is arranged a compression spring 43, the opposite ends of these springs contacting with the plates 28 and 40, as shown in Figure 7. The lower ends of these springs surround pins 44, preferably riveted to the bottom plate 28 to prevent lateral movement of the lower ends of the springs. The plate 40 is provided with a pair of depending pins 45 (Figure 4) vertically slidable in openings 46 formed in the adjacent portion of the block 24. Each pin 45 carries a head 47 slidable in an enlarged opening 48, formed in the block 24, and it will be apparent that the pins 45 act as guide pins to assist in providing vertical linear movement of the plate 40, while the heads 47 limit upward movement of the plate 40 and its block 25 by engaging the upper ends of the openings 48. The heads 47 and openings 46 and 48 are not shown in solid lines in the drawings but are identical with a similar means which is more completely illustrated and which will be referred to later.

The inner face of the block 27 is slidable over the adjacent faces of depending arms 49 formed integral with a block 50, arms 49 being employed instead of a solid vertical block as in the case of the block 27, in order to provide spaces 51 (Figure 8) to receive the springs 34 and their associated rods and the rod 36, when the filler device is vertically collapsed as will be apparent. A top plate 52 is riveted or otherwise secured to the top face of the block 50 and has its inner end extending in substantially overlapping relationship with the plate 40. The outer end of the plate 52 has its edge 53 (Figure 4) terminating in the plane of the outer face of the block 27. The plate 52 slidably engages the under side of the plate 40 and is provided with a depending flange 54 which lies behind and is slidable with relation to the flange 41 (Figure 7).

The block 27 is secured to a bottom plate 55 by any suitable means such as the rivets 56 shown in Figures 5 and 6. The plate 55 extends throughout the width of the filler device and has an upturned flange 57 which overlies and is slidable over the flange 41 (Figure 7). As shown in Figures 4 and 7 the plate 55 engages and is slidable over the lower face of the plate 28.

As shown in Figure 6 the block 27 is provided with a pair of openings 58 in which are arranged compression springs 59 the upper and lower ends of which respectively engage the plates 52 and 55 to urge these elements away from each other. The upper ends of the springs 59 surround pins 60 carried by the plate 52 to prevent lateral movement of the upper ends of the springs.

Means similar to the pins 45 (Figure 4) previously described are provided for limiting movement of the plates 52 and 55, and consequently the blocks 27 and 50, toward and away from each other. This means may be identical with the pin 45 and associated elements. Referring to Figures 4 and 8 it will be noted that a pair of vertical pins 61 are secured at their lower ends to the plate 55 and are slidable in openings 62 formed in two of the projections 49. The pins 61 are provided at their upper ends with heads 63 slidable in openings 64 formed in the block 50 and preferably extending through the plate 52. The pins tend to guide the plate 55 for movement straight toward and away from the plate 52 and the heads 63 limit movement of these plates away from each other under the influence of the springs 59.

The block 50 is provided with a horizontal projecting portion 65 (Figures 2 and 4) to form a support for the overlapping ends of the plates 40 and 52. The projecting portion 65 of the block 50 is centrally longitudinally grooved as at 66 and such groove is provided with an undercut 67. The plate 52 is provided with a longitudinal groove 68 registering with the groove 66 and a guide pin 69 has its shank portion arranged in the grooves 66 and 68. The lower end of the pin 69 is headed as at 70 for engagement with the undercut 67 and the upper end of the pin is riveted as at 71 to the plate 40.

The operation of the device is as follows:

It will be apparent that the top plates 40 and 52 are urged away from the bottom plates 28 and 55 by the sets of springs 43 and 59, and that the movement of the pairs of plates away from each other is limited by the stems 45 and 61. Accordingly the device has a predetermined maximum thickness. It also will be apparent that the springs 34 urge the blocks 24 and 27 away from each other and that the head 38 of the rod 36 limits movement of these blocks away from each other to predetermine the maximum longest dimension of the filler device. While the upper blocks 25 and 50 partake of vertical movement with respect to the lower blocks 24 and 27, the pins 45 and 61 fix the blocks 25 and 50 with relation to the blocks 24 and 27 endwise with respect to the filler structure as a whole. Accordingly any movement of the blocks 24 and 27 toward and away from each other is accompanied by similar movement of the blocks 25 and 50.

Accordingly it will be apparent that the filler structure is reducible in two dimensions, namely, vertically and longitudinally of the filler structure. It also will be apparent that the filler structure is of fixed width and accordingly there is no movement of any of the overlapping flanges 30, 41, 54 or 57 toward or away from the opposite edge of the filler structure. The structure is therefore adapted to be placed in the press chamber in the position shown in Figure 1 with the overlapping flanges referred to forming the end of the press chamber in place of the inner face of the wall 20. Thus the length of the press chamber is materially reduced, making it possible for the press to be employed for pressing and re-shaping the "skip" bellies. Where such bellies are placed in the press with the filler structure, the meat cannot be sufficiently compressed, and in any event, the belly would be proportionately reduced in three dimensions whereby the length of each strip of bacon cut from the resulting product would be somewhat shorter than is desirable.

With the device placed in position in the press chamber, as shown in Figure 1, a "skip" belly may be placed in the press chamber, whereupon the cover 21 may be slid into position closing the press chamber and providing the fixed upper horizontal wall of the chamber. The rams 16, 17 and 18 then may be operated as desired, for example, in accordance with the disclosure of my copending application referred to. The heads 13 and 14 will move horizontally inwardly at right angles to each other and it will be apparent that the head 13 has its end engaging the inner face of the head 14. It will be recalled that the head 13 is so constructed as to be collapsible in the direction of movement of the head 14 upon operation of the latter, but it is free to continue to move inwardly in its own direction of movement during operation of the head 14.

Accordingly it will be apparent that the belly will be pressed horizontally in two directions at right angles to each other, and the partial filling of the press chamber by the filler device facilitates the squaring of the belly, the skip bellies for which the present device is provided being substantially shorter than bellies of the usual size. Inward movement of the head 13 toward the filler device does not affect the latter in any way. However, the filler device is collapsible in the direction of movement of the head 14 in the manner previously described, thus permitting the head 14 to move inwardly to transversely press the belly. One longitudinal edge of the filler device engages the inner face of the wall 20 while the ends of the filler device engage respectively against the wall 19 and the head 14 to be collapsed upon movement of the head 14.

The operation of the ram 16 causes the platen 12 to move upwardly to vertically compress the belly. The filler device rests upon the platen while the top of the filler device engages against the bottom face of the cover 14. The filler device is vertically compressible in the manner described, thus permitting the platen to be moved upwardly by the ram 16 to vertically compress the bacon.

After the pressing operation has been completed the rams may be released and the cover 21 slid horizontally to open position, whereupon the pressed and squared belly may be removed to be sliced. The same operations obviously are repeated for successive "skip" bellies. When it is desired to again utilize the press for squaring bellies of normal size, it will be apparent that an attendant may lift the filler device from the press chamber. In this connection it will be noted that the filler device merely rests in position without being secured to any of the parts of the mold, and accordingly it readily may be placed in the press chamber when "skip" bellies are to be pressed and removed from the press chamber when bellies of normal size are to be squared.

Upon the releasing of the three rams to return the three movable parts of the press to normal position, it will be apparent that the various springs of the filler device will return the parts to their normal positions. It also will be apparent, as previously stated, that the rod 36 and pins 45 and 61 limit the movement of the parts to define the maximum dimensions of the filler device in two directions, the third dimension of the device, namely, the width thereof, being fixed. It will thus be apparent that the present device is particularly designed for use in connection with a three-dimensional apparatus and that one dimension of the filler device is fixed while the other two dimensions are variable in accordance with the operation of the press. The device thus is particularly useful with a three-dimensional press, and more especially with a press of the type shown in my copending application referred to for pressing "skip" bellies which can not be readily pressed without the use of the filler device.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. In combination with a press having a press chamber and means movable in three directions for reducing the capacity of said chamber, a filler device adapted to be arranged in said chamber, said device being constructed and arranged to be reducible in size in two directions upon movement of said means.

2. In combination with a press having a press chamber and means movable in three directions for reducing the capacity of said chamber, a filler device adapted to be arranged in said chamber, said device being constructed and arranged to be reducible in size in two directions upon movement of said means, and spring means tending to increase the size of said filler device in said two directions.

3. In combination with a press having a press chamber and means movable in three directions for reducing the capacity of said chamber, a filler device adapted to be arranged in said chamber, said device being constructed and arranged to be reducible in size in two directions upon movement of said means, spring means tending to increase the size of said filler device in said two directions, and means connected for limiting the increase in size of said filler in said two directions.

4. In combination with a press having a press chamber and pressing elements respectively movable in three directions to reduce the capacity of said chamber, said press having two stationary walls forming a part of said press chamber, a filler device adapted to be arranged in said chamber with one edge engaging one of said walls and its opposite edge fixed against movement toward said first named edge whereby said device has one fixed dimension, said device being constructed and arranged to be reducible in size in two other directions upon operation of said pressing elements.

5. In combination with a press having a press chamber and pressing elements respectively movable in three directions to reduce the capacity of said chamber, said press having two stationary walls forming a part of said press chamber, a filler device adapted to be arranged in said chamber with one edge engaging one of said walls and its opposite edge fixed against movement toward said first named edge whereby said device has one fixed dimension, said device being constructed and arranged to be reducible in size in two other directions upon operation of said pressing elements, and spring means tending to increase the size of said filler device in said two directions.

6. In combination with a press having a press chamber and pressing elements respectively movable in three directions to reduce the capacity of said chamber, said press having two stationary walls forming a part of said press chamber, a filler device adapted to be arranged in said chamber with one edge engaging one of said walls and its opposite edge fixed against movement toward said first named edge whereby said device has one fixed dimension, said device being constructed and arranged to be reducible in size in two other directions upon operation of said pressing elements, spring means tending to increase the size of said filler device in said two directions, and means connected for limiting the increase in size of said filler device in said two directions.

7. In combination with a press having a press chamber defined by two vertical stationary walls at right angles to each other, two vertical walls movable horizontally at right angles to each other, a horizontal wall fixed against vertical movement and a vertically movable horizontal wall, a filler device adapted to be arranged in said press chamber with one edge portion in engagement with one of said stationary vertical walls, the opposite edge portion of said device being parallel to one of said horizontally movable walls and fixed against horizontal movement in the direction of movement of such wall, said device having another edge engageable with the other vertical wall and being constructed and arranged whereby the edge opposite said last named edge is movable horizontally in the direction of movement of the other horizontally movable wall, said device being constructed and arranged to be vertically collapsible upon movement of said vertically movable wall.

8. In combination with a press having a press chamber defined by two vertical stationary walls at right angles to each other, two vertical walls movable horizontally at right angles to each other, a horizontal wall fixed against vertical movement and a vertically movable horizontal wall, a filler device adapted to be arranged in said press chamber with one edge portion in engagement with one of said stationary vertical walls, the opposite edge portion of said device being parallel to one of said horizontally movable walls and fixed against horizontal movement in the direction of movement of such wall, said device having another edge engageable with the other vertical wall and being constructed and arranged to be reducible in size in the direction of movement of the other horizontally movable wall, spring means resisting reduction in size of said filler device in such horizontal direction, said device being constructed and arranged to be reducible in size vertically upon movement of said vertically movable wall, and spring means tending to resist reduction in the vertical dimension of said device.

9. In combination with a press having a press chamber defined by two vertical stationary walls at right angles to each other, two vertical walls movable horizontally at right angles to each other, a horizontal wall fixed against vertical movement and a vertically movable horizontal wall, a filler device adapted to be arranged in said press chamber with one edge portion in engagement with one of said stationary vertical walls, the opposite edge portion of said device being parallel to one of said horizontally movable walls and fixed against horizontal movement in the direction of movement of such wall, said device having another edge engageable with the other vertical wall and being constructed and arranged to be reducible in size in the direction of movement of the other horizontally movable wall, spring means resisting reduction in size of said filler device in such horizontal direction, said device being constructed and arranged to be reducible in size vertically upon movement of said vertically movable wall, spring means tending to resist reduction in the vertical dimension of said device, and means for predetermining the maximum dimensions of said device in the two directions in which said device is reducible in size.

10. In combination with a press having a press chamber and means movable in three directions for reducing the capacity of said chamber, a filler device adapted to be arranged in said chamber, said device being constructed and arranged to be reducible in size in two directions upon movement of said means, said device having one edge portion forming a wall of said press chamber and formed of a plurality of relatively thin overlapping elements slidable with respect to each other when said device is reduced in size in each of said two directions.

11. In combination with a press having a press chamber and means movable in three directions for reducing the capacity of said chamber, a filler device adapted to be arranged in said chamber, said device being constructed and arranged to be reducible in size in two directions upon movement of said means, said device having one edge face forming a wall of said press chamber, and a pair of overlapping plates forming each of the top and bottom faces of said device, each of said plates having a flange forming a portion of said edge face and said flanges being arranged in overlapping relationship and slidable with respect to each other when said device is changed in size in each of said two directions.

12. In combination with a press having a press chamber and means movable in three directions for reducing the capacity of said chamber, a filler device adapted to be arranged in said chamber and comprising a plurality of block members, and a plurality of plate means each carried by one of said block members and defining certain faces of said device, one of such faces forming one wall of said press chamber, said plate means being arranged in overlapping relationship and said block members being arranged with respect to each other whereby said device is reducible in size in two directions upon operation of the movable means of said press.

13. In combination with a press having a press chamber and means movable in three directions for reducing the capacity of said chamber, a filler device adapted to be arranged in said chamber and comprising a plurality of block members, a plurality of plate means each carried by one of said block members and defining certain faces of said device, one of such faces forming one wall of said press chamber, said plate means being arranged in overlapping relationship and said block members being arranged with respect to each other whereby said device is reducible in size in two directions upon operation of the movable means of said press, and spring means arranged between certain pairs of said block members for resisting reduction in size of said device in said two directions.

14. In combination with a press having a press chamber and means movable in three directions for reducing the capacity of said chamber, a filler device adapted to be arranged in said chamber and comprising a plurality of block members, a plurality of plate means each carried by one of said block members and defining certain faces of said device, one of such faces forming one wall of said press chamber, said plate means being arranged in overlapping relationship and said block members being arranged with respect to each other whereby said device is reducible in size in two directions upon operation of the movable means of said press, spring means arranged between certain pairs of said block members for resisting reduction in size of said device in said two directions, and stop means constructed and arranged to predetermine the maximum dimensions of said device in said two directions.

15. In combination with a press having a press chamber and means movable in three directions for reducing the capacity of said chamber, a filler device adapted to be arranged in said chamber and comprising a plurality of block members, a pair of plate members defining each of the top and bottom faces of said device and each secured to one of said block members, the plates of each pair being arranged in overlapping sliding relationship and said block members being arranged whereby said device is reducible in size in one horizontal direction, one vertical edge face of said device forming one wall of said press chamber, and a flange carried by each of said plates and forming said edge face, said flanges being arranged in overlapping relationship whereby said device is reducible in size vertically and in said horizontal direction, said block members being constructed and arranged whereby said plates are movable toward each other to reduce the vertical dimension of said device.

16. In combination with a press having a press chamber and means movable in three directions for reducing the capacity of said chamber, a filler device adapted to be arranged in said chamber and comprising a plurality of block members, a pair of plate members defining each of the top and bottom faces of said device and each secured to one of said block members, the plates of each pair being arranged in overlapping sliding relationship and said block members being arranged whereby said device is reducible in size in one horizontal direction, one vertical edge face of said device forming one wall of said press chamber, a flange carried by each of said plates and forming said edge face, said flanges being arranged in overlapping relationship whereby said device is reducible in size vertically and in said horizontal direction, said block members being constructed and arranged whereby said plates are movable toward each other to reduce the vertical dimension of said device, and spring means arranged between certain pairs of said block members to resist a reduction in size of said device vertically and in said horizontal direction.

17. In combination with a press having a press chamber and means movable in three directions for reducing the capacity of said chamber, a filler device adapted to be arranged in said chamber and comprising a plurality of block members, a pair of plate members defining each of the top and bottom faces of said device and each secured to one of said block members, the plates of each pair being arranged in overlapping sliding relationship and said block members being arranged whereby said device is reducible in size in one horizontal direction, one vertical edge face of said device forming one wall of said press chamber, a flange carried by each of said plates and forming said edge face, said flanges being arranged in overlapping relationship whereby said device is reducible in size vertically and in said horizontal direction, said block members being constructed and arranged whereby said plates are movable toward each other to reduce the vertical dimension of said device, spring means arranged between certain pairs of said block members to resist a reduction in size of said device vertically and in said horizontal direction, and stop members arranged to predetermine the maximum vertical dimension of said device and the maximum dimension of said device in said horizontal direction.

18. A filler device for a press having a chamber reducible in size in three directions at right angles to each other, comprising a plurality of elements constructed and arranged for relative movement with respect to each other whereby said device is reducible in size in two directions at right angles to each other, said device being constructed and arranged to have a fixed third direction at right angles to said other directions.

19. A filler device for a press having a chamber reducible in size in three directions at right angles to each other, comprising a plurality of block elements, spring means resisting movement of certain of said block elements toward each other in one direction, spring means resisting movement of certain other blocks toward each other in a direction at right angles to said first named direction, and a plurality of plate means each carried by one of said block elements and arranged in sliding overlapping relationship whereby the block elements associated with the respective spring means are movable toward each other to reduce the size of said device in said two directions, said device having a fixed dimension at right angles to said two directions.

BENJAMIN J. PIERSON.